(12) United States Patent
Sundman et al.

(10) Patent No.: US 10,448,281 B2
(45) Date of Patent: Oct. 15, 2019

(54) METHOD AND APPARATUS FOR COMMUNICATION BETWEEN AN ACCESS POINT AND A SENSOR STATION

(71) Applicant: Telefonaktiebolaget LM Ericsson (publ), Stockholm (SE)

(72) Inventors: Dennis Sundman, Solna (SE); Piergiuseppe Di Marco, Sollentuna (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 15/551,496

(22) PCT Filed: Mar. 3, 2015

(86) PCT No.: PCT/SE2015/050240
§ 371 (c)(1),
(2) Date: Aug. 16, 2017

(87) PCT Pub. No.: WO2016/140602
PCT Pub. Date: Sep. 9, 2016

(65) Prior Publication Data
US 2018/0035331 A1 Feb. 1, 2018

(51) Int. Cl.
*H04W 28/12* (2009.01)
*H04W 4/70* (2018.01)
(Continued)

(52) U.S. Cl.
CPC .............. *H04W 28/12* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS

| 7,756,059 B1 | 7/2010 | Bharghavan |
| 2002/0186657 A1 | 12/2002 | Jain et al. |

(Continued)

FOREIGN PATENT DOCUMENTS

| EP | 1513281 A1 | 3/2005 |
| EP | 2109336 A1 | 10/2009 |

OTHER PUBLICATIONS

IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation", IEEE P802.11ah™/D3.0, Oct. 2014, pp. 1-611.

(Continued)

*Primary Examiner* — Lonnie V Sweet
(74) *Attorney, Agent, or Firm* — Coats & Bennett, PLLC

(57) ABSTRACT

The present disclosure relates to an access point (2) and to a sensor station (4) and methods performed therein. The access point (2) is adapted to communicate with the sensor station (4) and vice versa, over a communication channel using a contention based channel access. The access point (2) monitors (110) the traffic of the communication channel and estimates a congestion level of the communication channel. Information indicating the congestion level is incorporated (125) into a synchronization frame (200; 300) which is transmitted (140) to the sensor station (4). The sensor station (4) uses the congestion information when it selects which modulation and coding scheme it should use when sending data to the access point.

20 Claims, 4 Drawing Sheets

(51) Int. Cl.

| | | |
|---|---|---|
| *H04L 1/00* | (2006.01) | |
| *H04L 1/18* | (2006.01) | |
| *H04L 12/801* | (2013.01) | |
| *H04W 28/02* | (2009.01) | |
| *H04L 12/807* | (2013.01) | |
| *H04W 56/00* | (2009.01) | |
| *H04L 12/26* | (2006.01) | |
| *H04W 88/08* | (2009.01) | |

(52) U.S. Cl.
CPC .............. *H04L 1/0015* (2013.01); *H04L 1/18* (2013.01); *H04L 1/1877* (2013.01); *H04L 47/127* (2013.01); *H04L 47/27* (2013.01); *H04W 4/70* (2018.02); *H04W 28/0215* (2013.01); *H04W 28/0284* (2013.01); *H04W 56/001* (2013.01); *H04L 1/188* (2013.01); *H04L 43/16* (2013.01); *H04W 88/08* (2013.01)

(56) References Cited

U.S. PATENT DOCUMENTS

| | | | |
|---|---|---|---|
| 2002/0193118 A1* | 12/2002 | Jain | .......................... H04W 4/24 455/453 |
| 2005/0094607 A1 | 5/2005 | Zaki et al. | |
| 2007/0129081 A1 | 6/2007 | Seo et al. | |
| 2008/0212504 A1* | 9/2008 | Venkataraman | ........ H04L 45/00 370/310 |
| 2010/0169723 A1 | 7/2010 | Baldo et al. | |
| 2012/0287849 A1* | 11/2012 | Wilczewski | ........ H04W 74/085 370/328 |
| 2013/0176864 A1 | 7/2013 | Quan et al. | |
| 2014/0064128 A1* | 3/2014 | Park | ....................... H04W 48/12 370/252 |
| 2014/0293868 A1* | 10/2014 | Levanen | ................ H04L 1/1607 370/328 |
| 2015/0103767 A1* | 4/2015 | Kim | ....................... H04W 74/06 370/329 |
| 2016/0029357 A1* | 1/2016 | Lv | ........................ H04W 72/04 370/235 |

OTHER PUBLICATIONS

Linux Wireless, "minstrel rate control algorithm for mac80211", pp. 1-9, retrieved on Aug. 16, 2017, retrieved from Internet https://wireless.wiki.kernel.org/en/developers/Documentation.

Huang, K. et al., "H-RCA: 802.11 Collision-Aware Rate Control", IEEE/ACM Transactions on Networking, Aug. 2013, pp. 1021-1034, vol. 21, No. 4.

* cited by examiner

METHOD AND APPARATUS FOR COMMUNICATION BETWEEN AN ACCESS POINT AND A SENSOR STATION

TECHNICAL FIELD

Embodiments of the present technology presented herein generally relate to radio communication. More particularly, the embodiments presented herein generally relate to communication between an Access Point (AP) and sensor STAtion (STA) and vice versa.

BACKGROUND

The demand for Machine-to-Machine (M2M) and Internet of Things (IoT) communications is growing fast. The IoT is the network of physical objects or "things" embedded with electronics, software, sensors and connectivity to enable it to achieve greater value and service by exchanging data with the manufacturer, operator and/or other connected devices. Each thing is uniquely identifiable through its embedded computing system and is able to be interoperated within the existing Internet infrastructure. Typically, IoT is expected to offer advanced connectivity of devices, systems, and services that goes beyond M2M communications and covers a variety of protocols, domains, and applications. Things, in the IoT, can refer to a wide variety of devices such as heart monitoring implants, biochip transponders on farm animals, electric clams in coastal waters, automobiles with built-in sensors, or field operation devices that assist firefighters in search and rescue. These devices collect useful data with the help of various existing technologies and then autonomously flow the data between other devices. Current market examples include smart thermostat systems and washer/dryers that utilize WiFi for remote monitoring. IoT is expected to generate large amounts of data from diverse locations that are aggregated at a very high-velocity, thereby increasing the need to better index, store and process such data.

There is a new WiFi standard, IEEE P802.11ah D3.0, "Draft Standard for Information technology—Telecommunications and information exchange between systems Local and metropolitan area networks—Specific requirement", that is focused on meeting this growing demand of M2M and IoT communications. This standard utilizes sub-1 GHz license-exempt bands in order to provide an extended range and potentially connectivity of up to thousands of STAs per AP. One of the use cases within this standard is directed towards sensors and meters. Such sensors and meters are of a node type defined as a non Access Point STAtion (non-AP STA) and may be deployed to monitor some type of natural activity and then report sensor measurements to an AP, either periodically or in an event-based fashion. Measuring the temperature in a certain geographical area may be an example of such monitoring activity. The temperature measurements are the sent periodically, for example hourly or daily, to an AP and may then be forwarded to some application server. In order to save energy such sensor nodes will typically be sleeping most of the time and only wake up to take a temperature sample and transmit the sample to the AP. Such sensor nodes may also often be deployed in areas where recharging or replacing the power source is difficult. Therefore it is expected that the power source lasts for several years before it needs to be replaced.

The new WiFi standard IEEE P802.11ah D3.0, hereinafter 802.11ah, introduces a new sensor STA. This is a new type of non-AP STA, using data frames with small payload size. It is also expected to have limited available power, low duty cycle and low traffic volumes. These sensor STA's are typically deployed in static locations and are defined in Section 3 "Definitions, acronyms, and abbreviations" of 802.11ah.

Since energy efficiency is a key when it comes to these sensor STA's the choice of a modulation and coding scheme (MCS) is of great importance. The 802.11ah standard does not specify how to choose the MCS. The determination of the most suitable MCS is instead done through vendor specific algorithms running in the STA. Many commonly used algorithms are variants of the Minstrel algorithm (see "Linux Kernel Wireless" http://wireless.kernel.org/en/developers/Documentation/mac80211/RateControl/minstrel). The idea with the Minstrel algorithm is to first attempt transmitting a packet with the MCS that is expected to provide the best throughput. If the package is lost, the Minstrel algorithm will choose a more robust MCS and attempt retransmission. A more robust MCS means that more bits and energy will be used in the retransmission, and that the retransmission will take longer time. This procedure, i.e. choosing a more robust MCS followed by retransmission, is repeated three times before the package is reported as lost to higher layers. The success rates of old transmissions are stored for later use when deciding which MCS to use for the next packet. The Minstrel algorithm also periodically tries random MCS's in order to estimate and determine the MCS that maximizes the throughput. The standard Minstrel algorithm, as well as many other 802.11ah link adaptation mechanisms, relies on the statistics of lost packets.

The 802.11 standard was not originally conceived to achieve power efficiency. Since sensors and other IoT devices require low power consumption, the 802.11ah amendment introduces several new features targeting increased power efficiency. One such feature is the Target Wake Time (TWT), which enables scheduling of STA's to operate at different times, in order to minimize both access contentions and the time STA's must be awake. Another power saving feature introduced in 802.11ah is the Open-Loop Link Margin Index. This feature is intended for low-duty cycle sensors, and it helps the STA to quickly estimate the MCS. As the name indicates, the Link Margin Index contains link margin information, and it is included in beacon frames or probe response frames from the AP to the STA. Yet another power saving feature in 802.11ah is to allow larger sleep periods compared to previous versions of the 802.11 standard. However, these longer sleep periods also introduce new challenges. One such challenge is that, according to 802.11, a STA that has been asleep for a long time period and now wakes up, i.e. is changing its status from DOZE to AWAKE in order to transmit, must perform a Clear Channel Assessment (CCA) until the frame sequence is detected or until a ProbeDelay time has expired. In case the STA wakes up shortly after a beacon, it may have to wait and listen during the whole Target Beacon Transmission Time (TBTT) period until the next beacon, or the whole ProbeDelay time, in order to acquire time synchronization. During this listening period power will be consumed, and thus in one way counteracts the energy savings made during the long time sleeping period. To alleviate this problem, the 802.11ah amendment introduced an AP assisted medium synchronization mechanism in order to minimize the duration of this listening period. To achieve this improved synchronization, the AP sends a short synchronization frame in the beginning of the TWT and a Random Access Window (RAW). The format of this short sync frame is of a type; No Data Packet-Clear To Send (NDP-CTS). This synchronization procedure is described in detail in Section 9.42c.1 of the 802.11ah standard.

Even if this AP assisted medium synchronization mechanism to some extent improves the energy efficiency of sensor STA's there is still room for improvements. As mentioned above there are very stringent battery life requirements for the sensor STA's. It is essential that the sensor STA, at the time of waking up, can transmit its data to the AP as power efficiently as possible. To do this, choosing the right MCS is of great importance. The Open-Loop Link Margin Index feature mentioned above addresses this problem, but it only gives information to the STA about the link budget. The information about link budget is collected at the AP based on the previous transmissions from the STA. This may be sufficient for STA's having short sleeping cycles. However, sensor STA's have long sleeping cycles and when the sensor STA wakes up, the propagation environment may have changed significantly since the last transmission. Thus, there is a major risk that the link budget information may be outdated due to changes in the transmission activity of nearby (visible and hidden) STA's.

In the 802.11ah sensor use case, it is envisioned that the communication environment is static but heavily congested and the risk of losing a packet due to interference and hidden STA's is greater than the risk of losing a packet due to poor channel conditions. However, the existing link adaptation methods, such as the Minstrel algorithm mentioned above, will reduce the MCS value when it performs a retransmission due to lost packets. If the packets are lost due to poor channel conditions this procedure guarantees a higher successful reception probability for the retransmitted packet. However, if the packet is lost because of a collision with a transmission from a contending STA this algorithm will have the opposite effect.

Using more energy during longer times will pollute the wireless environment even more. Since the packet was lost because of collision, there is at least another STA in the AP range that also wants to transmit data. Thus, if all contending STA's choose more robust MCS upon collisions, the channel utilization increases and the probability of success in the retransmission decreases. If the robustness of the MCS is further increased, this may start a vicious circle between all contending STA's and further decrease the probability of success for the retransmission. This is particularly critical in the presence of hidden STA's.

SUMMARY

It is in view of the above considerations and others that the various embodiments disclosed herein have been made.

In one of its aspects, the technology presented herein concerns a method performed by an access point (AP) adapted to communicate with a sensor station (STA) over a communication channel using a contention based channel access. The method comprises monitoring traffic of the communication channel and estimating a congestion level of the communication channel based on the monitored traffic. Information indicative of the estimated congestion level is incorporated into a synchronization frame, which is transmitted to the sensor STA.

Advantageously, the congestion level may be estimated based on a time slot occupancy of the communication channel, which may be estimated as a number of occupied time slots in a time window divided by a total number of time slots available in the time window.

Furthermore, in an exemplary embodiment the information indicative of the estimated congestion level may comprise at least one bit having a first value if the estimated congestion level is below a threshold and a second value if the estimated congestion level is above the threshold. The information indicative of the estimated congestion level may be incorporated in the signal (SIG) field contained in the preamble of the synchronization frame.

In yet another exemplary embodiment the method may use at least one bit of the synchronization frame to transmit either the information indicative of the estimated congestion level or other information and broadcast information indicative of whether the at least one bit of the synchronization frame provides the information indicative of the estimated congestion level or the other information.

In another of its aspects, the technology presented herein concerns a method performed by a sensor STA, adapted to communicate with an AP over a communication channel using a contention based channel access. The method comprises receiving, from the access point, a synchronization frame comprising information indicative of an estimated congestion level of the communication channel. The sensor STA transmits a data packet using a first modulation and coding scheme and monitors whether an acknowledgement of the data packet is received from the access point. If the acknowledgement of the data packet is not received the sensor STA selects a second modulation and coding scheme based on the information comprised in the synchronization frame and indicative of the estimated congestion level and then retransmits the data packet using the second modulation and coding scheme.

Advantageously, selecting the second modulation and coding scheme comprises selecting a default modulation and coding scheme as the second modulation and coding scheme in response to that the information received in the synchronization frame indicates that the estimated congestion level is below a threshold; and selecting the first modulation and coding scheme as the second modulation and coding scheme in response to that the information received in the synchronization frame indicates that the estimated congestion level is above the threshold.

In some embodiments a symbol of the default modulation and coding scheme may comprise less data than a symbol of the first modulation and coding scheme.

In still another of its aspects the technology presented herein concerns an access point adapted to communicate with a sensor STA over a communication channel using a contention based channel access. The AP comprises a processor, a memory, a transmitter and receiver. The memory comprises instructions executable by the processor such that the AP is operative to monitor traffic of the communication channel; estimate a congestion level of the communication channel based on the monitored traffic; incorporate information indicative of the estimated congestion level into a synchronization frame, and by means of a transmitter transmit the synchronization frame to the sensor STA.

In some embodiments the access point is operative to estimate the congestion level based on a slot occupancy of the communication channel. The AP may be operative to estimate the congestion level as a number of occupied slots in a time window divided by a total number of slots in the time window.

In some embodiments, the synchronization frame that the AP transmits may comprise at least one bit having a first value if the estimated congestion level is below a threshold and a second value if the estimated congestion level is above the threshold.

The AP may further be operative to use at least one bit of the synchronization frame to transmit either the information indicative of the estimated congestion level or other information; and broadcast, by means of the transmitter, information indicative of whether the at least one bit of the synchronization frame provides the information indicative of the estimated congestion level or the other information.

In exemplary embodiments the AP is further operative to transmit, by means of the transmitter, the information indicative of the estimated congestion level in the preamble of the synchronization frame.

In yet another of its aspects the technology presented herein concerns a sensor STA adapted to communicate with an AP over a communication channel using a contention based channel access. The sensor STA comprises a processor, a memory, a transmitter and receiver. The memory comprises instructions executable by the processor whereby the sensor STA is operative to receive, by means of the receiver, a synchronization frame comprising information indicative of an estimated congestion level of the communication channel from the AP; transmit, by means of the transmitter a data packet using a first modulation and coding scheme; monitor whether an acknowledgement of the data packet is received; and if the acknowledgement of the data packet is not received select a second modulation and coding scheme based on the information indicative of the estimated congestion level; and retransmit, by means of the transmitter, the data packet using the second modulation and coding scheme.

In some embodiments the sensor STA is further operative to select a default modulation and coding scheme as the second modulation and coding scheme in response to that the received information, in the synchronization frame indicates that the estimated congestion level is below a threshold; and select the first modulation and coding scheme as the second modulation and coding scheme in response to that the received information, in the synchronization frame, indicates that the estimated congestion level is above the threshold.

In yet another of its aspects the technology presented herein concerns a computer program product comprising a computer readable medium, having thereon a computer program comprising program instructions, the computer program being loadable into a data-processing unit and adapted to cause execution of the method according to any of its embodiments when the computer program is run by the data-processing unit.

Thus, the above aspects describe an access point aided MCS selection strategy for the sensor STA when it wakes up, which will enable the sensor STA to save power. Specifically, the AP measures network-congestion and communicates the congestion level to the sensor STA in a synchronization frame. In order to do so the synchronization frame has to be modified to be able to signal this congestion information to the sensor STA.

The sensor STA then utilizes the synchronization frame to acquire the congestion information, which the sensor STA uses in its MCS selection algorithm.

Thus, there are two main benefits with this solution. Firstly, there is the energy saving at the sensor STA since much of the work and measurements are instead done by the AP. Secondly there will be a reduction of congestion in the sensor network since the energy level will be kept the same when performing retransmission in a congested environment.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art.

Figure 1:
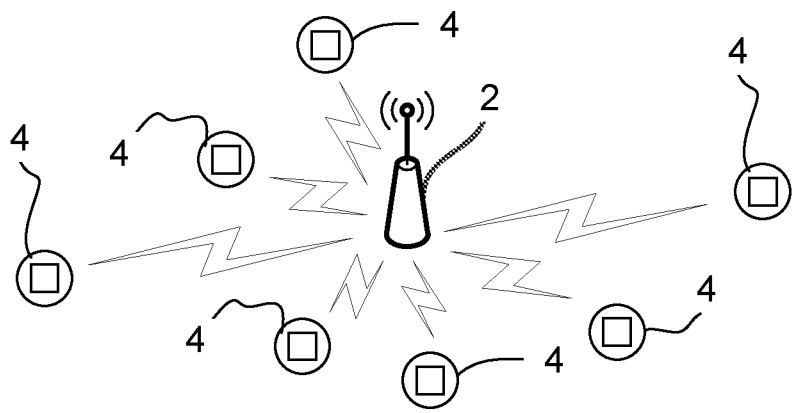
FIG. 1 shows an example of a radio network comprising an access point (AP) and several sensor stations (STA's)

FIG. 1 shows an example of a radio network comprising an AP 2 and several sensor STA's 4. The access point 2 serves a number of sensor STA's 4, such as defined in Section 3 "Definitions, acronyms, and abbreviations" of the standard IEEE P802.11ah D3.0. Even if only seven sensor STA's are shown in FIG. 1 it should be understood that an AP 2 may serve many more, up to thousands sensor STA's. The communication environment shown in FIG. 1 is usually static but heavily congested and the AP 2 and the sensor STA 4 communicate over a communication channel using a contention based channel access (see 9.2.4.2 of 802.11ah). There is a risk of packet loss due to interference and also due to hidden STA's. It is in this environment the sensor STA 4 has to select an appropriate modulation and coding scheme (MCS). As mentioned above in the background a more robust MCS also means that more energy will be used for the transmission at the sensor STA 4. Since energy efficiency is of outmost importance for sensor applications, the sensor STA should avoid choosing more robust MCS, unless absolutely necessary.

When the sensor STA 4 wakes up in the environment shown in FIG. 1 it has no knowledge of the level of congestion in the network since it has been asleep. Traditionally, the acquisition of this congestion information at the sensor STA 4 requires that monitoring communication channel for some time. This of course, drains the energy of the sensor STA and is thus undesirable. Even if the sensor STA 4 would know the level of congestion there are problems when the sensor STA uses the common Minstrel-like algorithm when performing a retransmission attempt due to heavy congestion. As mentioned above the Minstrel algorithm will still lower the MCS during its retransmission attempts. This is, as already mentioned, not a desired behavior if the packet is lost due to collision with contending or hidden STA's. So even if the new power saving feature Open-Loop Link Margin Index helps the sensor STA 4 to quickly choose the correct MCS, it will only take into account the previous link budget and does not provide any information regarding the current level of network congestion. The present technology is based on using the current level of network congestion in order to perform a quick and energy efficient estimation of the appropriate MCS, which will be described further below in conjunction with FIGS. 4 to 7.

Figure 2:
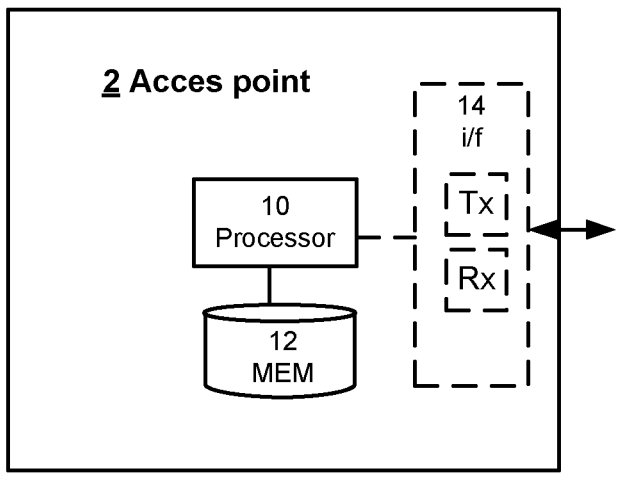
FIG. 2 shows an example embodiment of an AP.

FIG. 2 shows an example embodiment of an AP 2. The AP 2 is configured to operate in a WiFi network according to the 802.11ah standard or equivalent and communicating with a large amount of sensor STA's 4. The AP 2 comprises a communications interface 14. The communications interface 14 may comprise a transmitter (Tx) and/or a receiver (Rx). Alternatively, the communications interface 14 may comprise a transceiver. Also, the AP 2 comprises a processor 10, and a memory 12. The memory 12 comprises instructions executable by the processor 10, whereby the AP 2 is operative to perform the method 100 according to FIG. 4. Additionally, or alternatively, the memory 12 comprises instructions executable by the processor 10, whereby the AP 500 is operative to perform the method according to FIG. 4. In other words, the memory 12 comprises instructions executable by the processor 10, whereby the AP 2, 500 is operative to monitor traffic of the communication channel; estimate a congestion level of the communication channel based on the monitored traffic; incorporate, into a synchronization frame 200; 300 (see FIGS. 5 and 6), information indicative of the estimated congestion level and transmit, by means of the transmitter 14, said synchronization frame 200; 300 comprising information indicative of the estimated congestion level to the sensor STA 4.

In an exemplary embodiment the AP 2 may further be operative to estimate the congestion level based on a slot occupancy of the communication channel. The slot occupancy may be defined as a number of occupied slots in a time window divided by a total number of slots in the time window. The synchronization frame 200; 300 may comprise at least one bit 206; 306; 308 (see FIGS. 5 and 6) having a first value if the estimated congestion level is below a threshold and a second value if the estimated congestion level is above the threshold.

According to one embodiment the AP 2 may further be operative to use the at least one bit of the synchronization frame 200; 300 to transmit other information than the information indicative of the estimated congestion level. In such embodiment the access is further operative to broadcast, by means of the transmitter 14, information indicative of whether the at least one bit of the synchronization frame 200; 300 provides the information indicative of the estimated congestion level or the other information.

Figure 3:
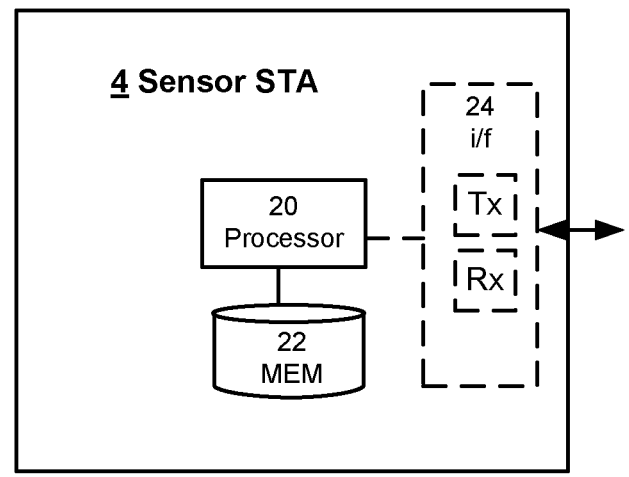
FIG. 3 shows an example embodiment of sensor STA.

FIG. 3 shows an example embodiment of a sensor STA 4. The sensor STA 4 is configured to operate in a WiFi network according to the 802.11ah standard or equivalent and communicating with the AP 2 described above. The sensor STA 2 comprises a communications interface 12. The communications interface 24 may comprise a transmitter (Tx) and/or a receiver (Rx). Alternatively, the communications interface 24 may comprise a transceiver. Also, the sensor STA 4 comprises a processor 20, and a memory 22. The memory 22 comprises instructions executable by the processor 20, whereby the sensor STA 4 is operative to perform the method 400 according to FIGS. 7A and 7B. Additionally, or alternatively, the memory 22 comprises instructions executable by the processor 20, whereby the sensor STA 600 is operative to perform the method according to FIGS. 7A and 7B. In other words, the memory 22 comprises instructions executable by the processor 20, whereby the sensor STA 4, 600 is operative to receive, by means of the receiver 24, a synchronization frame comprising information indicative of an estimated congestion level of the communication channel from the AP; transmit, by means of the transmitter 24 a data packet using a first modulation and coding scheme; monitor whether an acknowledgement of the data packet is received; and if the acknowledgement of the data packet is not received select a second modulation and coding scheme based on the information indicative of the estimated congestion level; and retransmit, by means of the transmitter 24, the data packet using the second modulation and coding scheme.

In an exemplary embodiment the sensor STA 4 is further operative to select a default modulation and coding scheme as the second modulation and coding scheme in response to that the received information, in the synchronization frame 200; 300 indicates that the estimated congestion level is below a threshold; and select the first modulation and coding scheme as the second modulation and coding scheme in response to that the received information, in the synchronization frame 200;300, indicates that the estimated congestion level is above the threshold.

Figure 5:
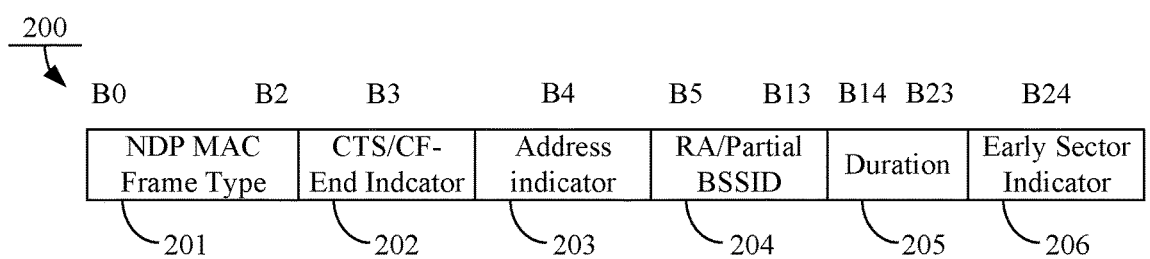
FIG. 5 shows an embodiment of a signal (SIG) field in a preamble of a synchronization frame.
Figure 6:
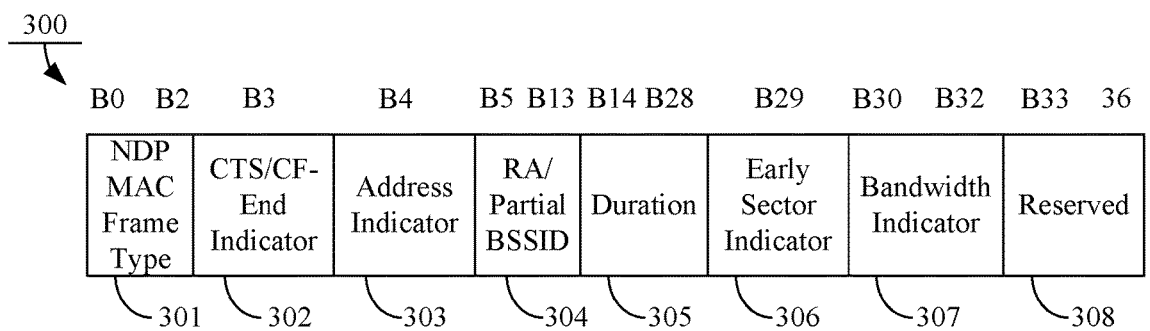
FIG. 6 shows another embodiment of a SIG field in the preamble of a synchronization frame.

With further reference to FIGS. 5 and 6 the synchronization frame 200; 300 into which the estimated congestion level is incorporated will be closer described. The synchronization frame is an NDP-CTS packet. There are two kinds of NDP CTS packets defined in 802.11ah. The first kind, shown in FIG. 5, is used for the S1G_1M preamble and is only present in 1 MHz bandwidth transmissions. The second kind of NDP CTS packet, shown in FIG. 6, is used for S1G_SHORT and S1G_LONG preambles and may be present in transmissions for all bandwidths except for 1 MHz bandwidth transmissions.

As is evident from FIG. 5, all fields 201-206 of the NDP CTS packet for the S1G_1M preamble are dedicated to certain tasks. One of these fields 206 is the "Early Sector Indicator", which is bit number 24 (B24). B24 is used to indicate that following the NDP CTS packet, a sectorized beam frame exchange is going to take place. This behavior is typically only desirable when there is a significant amount of data to transmit. In the environment of the present technology the sensor STA's are simple sensor nodes with small payload sizes and with low duty cycles and low traffic volumes. The inventors realized that in such cases there is no point in using this bit B24. The reason is that beamforming, as standardized in 802.11ah, requires a non-negligible amount of signaling and overhead, which is highly undesirable for sensor STA's 4. Therefore, for sensor STA's bit B24 is instead used to represent congestion. In one exemplary embodiment of the invention the sensor STA 4 will interpret B24 as a congestion bit, while non-sensor STA's will interpret B24 as an early sector indicator bit, as shown in FIG. 5. In another embodiment the AP 4 may broadcast, in the beacon frame, whether or not the sensor STA's should interpret the bit B24 as an early sector indicator bit or as a congestion indicator bit.

In FIG. 6 the NDP CTS packet for the S1G_SHORT and S1G_LONG preamble comprises different fields 301-308 reserved for certain tasks. Compared to the preamble disclosed in FIG. 5 the are more options to indicate congestion using the preamble depicted in FIG. 6. One of these fields 306 is the "Early Sector Indicator", which is bit number 29 (B29). In an exemplary embodiment the sensor STA 4 may interpret field bit B29 as a congestion bit, while non-sensor STA's may interpret bit B29 as an early sector indicator bit. In another exemplary embodiment, the AP 2 may broadcast, in the beacon frame, whether the sensor STA's should interpret B29 as an early sector indicator or as a congestion indicator. As is evident in FIG. 6, this NDP CTS packet contains more bits than in the NDP CTS packet depicted in FIG. 5. The reason for this is that this NDP CTS packet also is used for larger bandwidths. Since there are four reserved but unspecified bits, B33-B36, in field 308 of the NDP CTS packet of FIG. 6, these may according to yet another embodiment be used to indicate the congestion level. For example, the last of these bits, B36 may be used to indicate congestion to the sensor STA. But it is also possible to use more than one bit to signal the level of congestion. If for example two bits are used it will be possible to communicate four different levels of congestion from the AP 2 to the sensor STA's 4. In such a case the sensor STA 4 may be configured to use different MCSs depending on the level of congestion.

Figure 4:
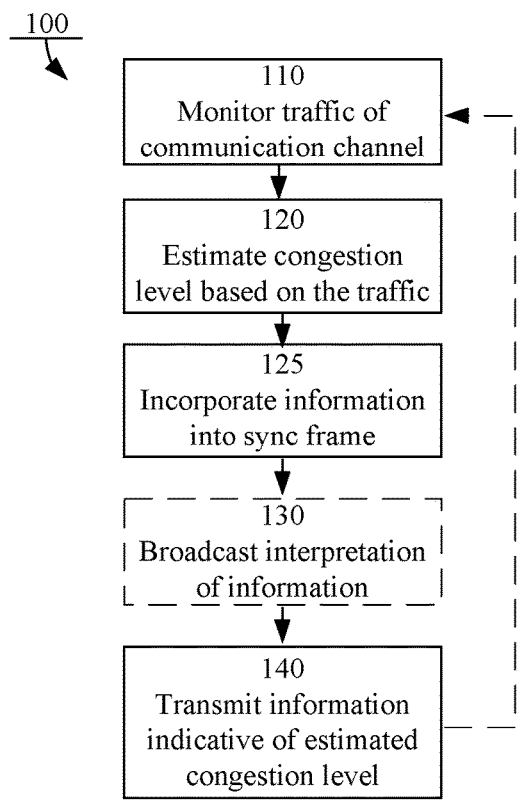
FIG. 4 shows a flowchart of a method according to an embodiment performed in an AP.

Turning now to FIG. 4 a method performed by the AP 2 will be described. The AP 2 is as mentioned above adapted to communicate with a sensor STA 4 over a communication channel using a contention based channel access. To use the NDP CTS packet preamble to indicate congestion will require modifications both at the AP 2 and the sensor STA 4. The method performed by the sensor STA 4 will be described in more detail in conjunction with FIG. 7.

The AP 2 needs to estimate the amount of congestion in the wireless medium. There are many different options to measure congestion which will be further described below. It is beneficial to let the AP 2 implement the estimation of congestion, since the AP 2 is constantly awake and can continuously monitor the incoming data traffic. Moreover, in sensor and metering applications, the amount of incoming traffic is typically homogeneously distributed and stationary among the sensor STA's 4. This also makes the predictions from the AP 2 side more accurate than in other scenarios. One benefit with letting the AP 2 estimate the congestion, i.e. let the sensor STA 4 "rest", is that is it will save energy at the sensor STA's 4 since they do not need to perform any congestion measurements.

Thus, the method 100 starts with step 110, in which the AP 2 monitors the traffic of the communication channel used for communication between the AP 2 and the sensor STA's. Based on the monitored traffic the AP 2 estimates, in step 120, a congestion level of the communication channel. Depending on how many bits that are used for the indicating the congestion this may be done in different ways. In one embodiment the AP 2 will set one congestion bit to 1 in the NDP CTS packet that is sent to the STA's for the fast frame synchronization if the AP 2 considers the risk of packet collision to be high, i.e. if the congestion level is above a predetermined threshold. In other words the bit 206; 306 may have a first value if the estimated congestion level is below a threshold and a second value if the estimated congestion level is above the threshold. If more than one bit, i.e. field 308, is available, the AP 2 may send a number associated to the level of contention. This information indicating the estimated congestion level is then, in step 125, incorporated into the synchronization frame 200; 300 and, in step 140, transmitted to the sensor STA (4). In an exemplary embodiment the information indicative of the estimated congestion level may be incorporated into the preamble of the synchronization frame 200; 300.

The congestion level may in one exemplary embodiment be measured as time slot occupancy of the communication channel. One way to do this and estimate the congestion level is to the count number of occupied time slots in a time window and divide it by the total number of time slots available in that time window. This will give an instantaneous value for a time window. It is also possible in some embodiments to use filtering means that establish a mean value of the congestion level for several time windows.

As mentioned above bit B24 and B29 in FIG. 5 and FIG. 6, respectively are specified to be used as an "early sector indicator" in the standard 802.11ah, but may according to the inventors be used as congestion bits for sensor STA's 4. However, if the network environment depicted in FIG. 3 also would comprise "ordinary" STA's with a need to send larger amounts of data, these STA's would have problems with interpreting the "congestion bits". It is therefore envisioned for some embodiments that the synchronization frame 200; 300 may transmit either the information indicative of the estimated congestion level or other information, for example the early sector indicator. In such a case the AP is operative to broadcast, in step 130, information indicative of whether the at least one bit of the synchronization frame (200; 300) provides the information indicative of the estimated congestion level or the other information. As is depicted in FIG. 4 by dashed lines step 130 is an optional step.

Thus, the basic idea with the above described method 400 is to monitor, estimate and then incorporate the congestion information into a synchronization frame 200; 300 which is transmitted to the sensor STA, which will use this congestion information in its MCS selection process. The method performed by a sensor STA 4 will now be described in conjunction with FIG. 7A. The sensor STA 4 is adapted to communicate with the AP 2 over a communication channel using a contention based channel access. As mentioned above a sensor STA 4 is asleep most of the time. Thus, if the sensor STA 4 is asleep it will first have to wake up, in optional step 405. When the sensor STA is awake it will, in step 410 receive the synchronization frame 200; 300 comprising information indicative of the estimated congestion level of the communication channel. The sensor STA 4 receives this congestion information from the AP 2. The congestion information is used by the sensor STA to decide which MCS to use when sending its data to the AP 2. Depending on how many bits that are used for indicating congestion there may be different predetermined MCS's that correspond to the indicated levels of congestion. If for example one bit is used there will be one scheme used when there is congestion and another scheme when there is no congestion. If two bits are used to indicate contestation there may be 4 different predetermined schemes that the sensor STA 4 will select from.

Figure 7A:
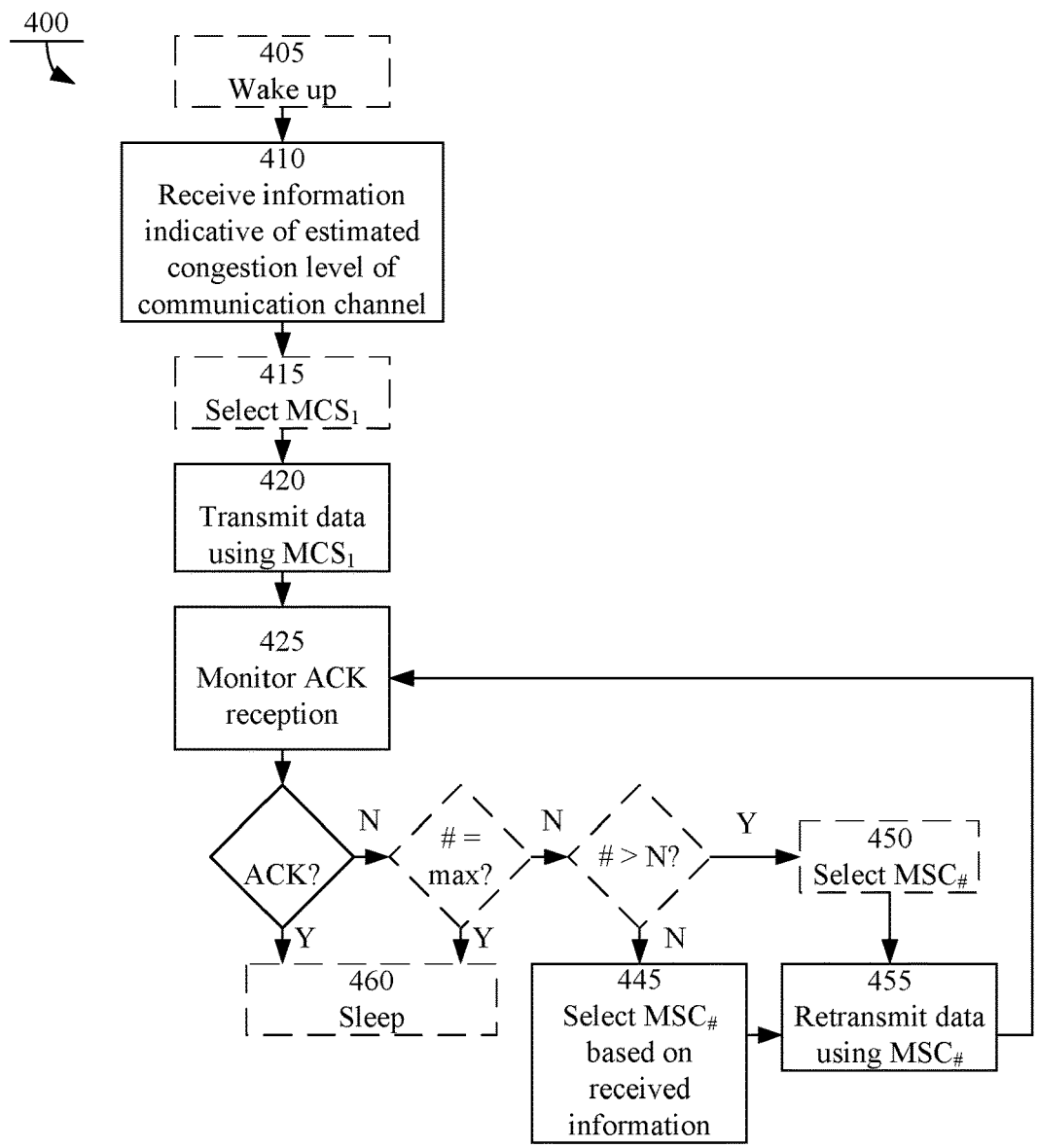
FIG. 7A shows a flowchart of a method according to an embodiment performed in a sensor STA.
Figure 7B:
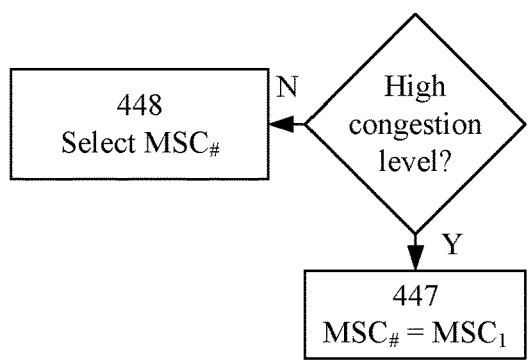
FIG. 7B shows a flowchart of a method according to another embodiment performed in a sensor STA.

However, it is not necessary that the sensor STA 4 at this stage uses the congestion information to select which MCS to use when sending data to the AP. Thus, step 415 in FIG. 7A is optional. Instead the first MSC may be predetermined without any consideration of the congestion information. Irrespectively if the MSC has been selected, in step 415, or is predetermined the sensor STA 4 will transmit, in step 420, a data packet using a first modulation and coding scheme. The sensor STA 4 then monitors, in step 425, whether it receives an acknowledgement that the data packet has been received by the AP 2. If the acknowledgement of the data packet is not received this means that the sensor STA was unsuccessful in sending data to the AP 2. Thus, in step 445, the sensor STA 4 will select a second modulation and coding scheme. At this stage the selection will always be based on the estimated congestion information comprised in the synchronization frame 200; 300 indicating the congestion level. In, step 455 the sensor STA 4 will retransmit the data packet using the second modulation and coding scheme. Once again the sensor STA 4 monitors, in step 425, whether it receives an acknowledgement that the data packet has been received by the AP 2. If not it will keep on retransmitting, step 455, until a maximum number (#=max) of retransmissions have been performed. Depending on the number # of the retransmission a suitable MCS will be selected in step 450. Instead of counting the number # of retransmissions a timer may be used in some alternative embodiments, which when it times out terminates the retransmission attempts.

As mentioned above the sensor STA 4 will, in step 445, select the second MCS based on the information in the synchronization frame 200; 300 indicating the congestion level. This selection process is closer shown in FIG. 7B. If there is no or little congestion, i.e. the estimated congestion level is below a threshold the sensor STA 4 will select, in step 448, a default MCS as the second MCS. However, if the estimated congestion level is above the threshold, i.e. the communication channel environment is congested; the sensor STA 4 will select, in step 447, the first MCS as the second MCS. This is the opposite of how the MCS's of today based on the Minstrel algorithm work. Thus, instead for increasing the consumed energy for the retransmission, the same MCS is used for the retransmission and the vicious circle between all contending STA's described in the background above is prevented.

In some embodiments a symbol of the default modulation and coding scheme may comprise less data than a symbol of the first modulation and coding scheme.

To summarize the method 400 of the sensor STA 4, the sensor STA 4 reads the stored congestion bit (or bits) upon receiving the synchronization NDP CTS frame. Using this bit, if the transmission of the packet fails, instead of choosing a more robust MCS (i.e. increasing the consumed energy for the next transmission) the MCS is kept also for concurrent transmission attempts. One such example is to keep the MCS for one retransmission attempt. If this first retransmission attempt fails, the standard procedure of reducing the MCS is followed.

Figure 8:
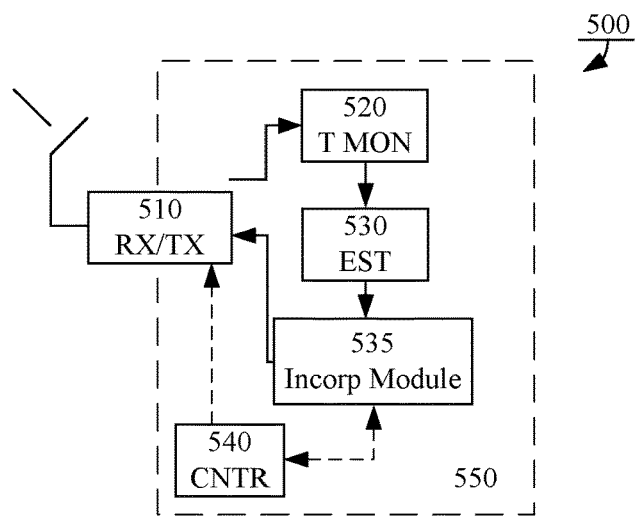
FIG. 8 illustrates an example implementation of an AP.

FIG. 8 is an example implementation of an access node 550. The access node 550 comprises a traffic monitor 520, an estimator 530, an incorporating module 535 a controller, a transmitter and/or receiver 510 and a controller 540 for controlling the other units/modules of the access node 550. This example implementation of the access node 555 is as the access node 2 described above adapted to communicate with a sensor STA 650, depicted in FIG. 9, over a communication channel using a contention based channel access. The traffic monitor 520 is configured to monitor the traffic of the communication channel. The estimator 530 is configured to estimate a congestion level of the communication channel based on the traffic monitored by the traffic monitor 520. The incorporating module 535 is configured to incorporate information into a synchronization frame. The incorporated information is indicative of the estimated congestion level. The transmitter 510 is configured to transmit the synchronization frame to the sensor STA, the synchronization frame comprising the information indicative of the estimated congestion level.

Furthermore, the estimator 530 is configured to estimate the congestion level based on a slot occupancy of the communication channel. The slot occupancy may be defined as a number of occupied slots in a time window divided by a total number of slots in the time window. As mentioned above in conjunction with FIG. 4 the synchronization frame 200; 300 comprises at least one bit 206, 306, 308 having a first value if the estimated congestion level is below a threshold and a second value if the estimated congestion level is above the threshold. The transmitter 510 may be configured to transmit the information indicative of the estimated congestion level in the preamble of the synchronization frame 200; 300. In an exemplary embodiment the AP 550 may use at least one bit of the synchronization frame 200; 300 to transmit either the information indicative of the estimated congestion level or other information. In such a case the transmitter 510 may be configured to broadcast information indicative of whether the at least one bit of the synchronization frame 200; 300 provides the information indicative of the estimated congestion level or the other information.

Figure 9:
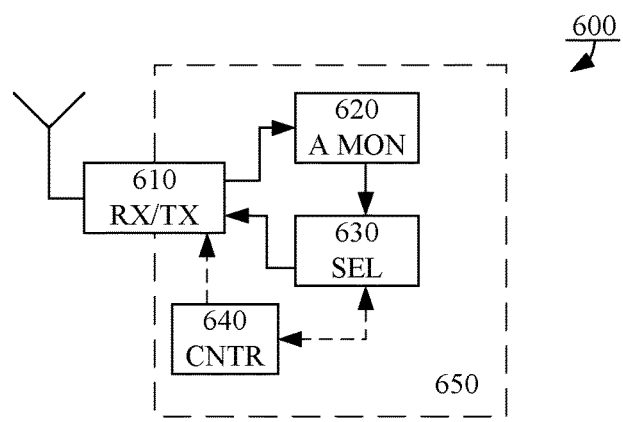
FIG. 9 illustrates an example implementation of an sensor STA.

FIG. 9 is an example implementation of a sensor STA 650. The sensor STA 650 comprises an acknowledge monitor 620, a selector 630, a receiver and/or transmitter 610 and a controller 640 for controlling the other units/modules of the sensor STA 650. Also in this example implementation the sensor STA 650 is, as the sensor STA 4 depicted in FIG. 3, adapted to communicate with the AP 550 over a communication channel using a contention based channel access. The receiver 610 is configured to receive, from the AP 550, the synchronization frame comprising the information that indicates the estimated congestion level of the communication channel. In response thereto the transmitter 610 is configured to transmit a data packet using a first modulation and coding scheme. The acknowledgement monitor 620 is configured to monitor whether an acknowledgement of the data packet is received from the AP 550. If the acknowledgement monitor 620 does not receive the acknowledgement that the data packet has been received by the AP 550 the selector 630 is configured to select a second modulation and coding scheme based on the information indicative of the estimated congestion level. The transmitter 610 is furthermore configured to retransmit the data packet using the second modulation and coding scheme.

In an exemplary embodiment the selector may further be configured to select a default modulation and coding scheme as the second modulation and coding scheme in response to that the received information, in the synchronization frame indicates that the estimated congestion level is below a threshold, i.e. there is no congestion or the congestion is low. However, if the received information, in the synchronization frame indicates that the estimated congestion level is above the threshold, i.e. there is congestion, the selector 630 is configured to select the first modulation and coding scheme as the second modulation and coding scheme.

Figure 10:
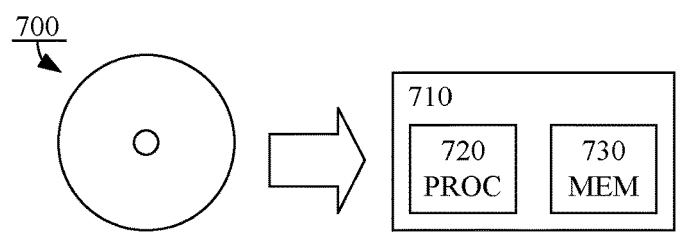
FIG. 10 illustrates another embodiment in the form of a computer program.

Turning now to FIG. 10, yet another embodiment is disclosed. FIG. 10 illustrates a computer program comprising instructions which, when executed on at least one processor 720 of an apparatus 710, will cause the apparatus 710 to perform any of the methods described in conjunction with FIG. 4 and FIG. 7. A carrier may comprise the above-mentioned computer program. The carrier may be a computer readable storage medium 700. Alternatively, the carrier may be one of an electronic signal, optical signal, or radio signal. In one embodiment, the apparatus 710 may be an AP and in another embodiment the apparatus 710 may be a sensor STA.

In the detailed description hereinabove, for purposes of explanation and not limitation, specific details are set forth such as particular architectures, interfaces, techniques, etc.

in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of the structure. Thus, for example, it will be appreciated by those skilled in the art that block diagrams herein may represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method of operating an access point adapted to communicate with a sensor station (STA) over a communication channel using a contention based channel access, the method comprising:
monitoring traffic of the communication channel;
estimating a congestion level of the communication channel based on the monitored traffic;
incorporating, into a synchronization frame, information indicative of the estimated congestion level, wherein the synchronization frame is a No Data Packet-Clear To Send (NDP-CTS) short synchronization frame; and
transmitting the synchronization frame, comprising the information indicative of the estimated congestion level, to the sensor STA.

2. The method of claim 1, wherein the congestion level is estimated based on a time slot occupancy of the communication channel.

3. The method of claim 2, wherein the congestion level is estimated as a number of occupied time slots in a time window divided by a total number of time slots available in the time window.

4. The method of claim 1, wherein the information indicative of the estimated congestion level comprises at least one bit having a first value if the estimated congestion level is below a threshold and a second value if the estimated congestion level is above the threshold.

5. The method of claim 1, wherein the information indicative of the estimated congestion level is incorporated into the preamble of the synchronization frame.

6. The method of claim 1, wherein the method comprises:
using at least one bit of the synchronization frame to transmit either the information indicative of the estimated congestion level or other information; and
broadcasting information indicative of whether the at least one bit of the synchronization frame provides the information indicative of the estimated congestion level or the other information.

7. A method of operating a sensor station (STA) adapted to communicate with an access point over a communication channel using a contention based channel access, the method comprising:
receiving a synchronization frame comprising information indicative of an estimated congestion level of the communication channel from the access point, wherein the synchronization frame is a No Data Packet-Clear To Send (NDP-CTS) short synchronization frame;
transmitting a data packet using a first modulation and coding scheme;
monitoring whether an acknowledgement of the data packet is received from the access point; and
if the acknowledgement of the data packet is not received:

selecting a second modulation and coding scheme based on the information comprised in the synchronization frame and indicative of the estimated congestion level; and retransmitting the data packet using the second modulation and coding scheme.

8. The method of claim 7, wherein the information indicative of an estimated congestion level is received in the preamble of the synchronization frame.

9. The method of claim 7, wherein selecting the second modulation and coding scheme comprises:

selecting a default modulation and coding scheme as the second modulation and coding scheme in response to the received information, in the synchronization frame, indicating that the estimated congestion level is below a threshold; and selecting the first modulation and coding scheme as the second modulation and coding scheme in response to the received information, in the synchronization frame, indicating that the estimated congestion level is above the threshold.

10. The method of claim 9, wherein a symbol of the default modulation and coding scheme comprises less data than a symbol of the first modulation and coding scheme.

11. A non-transitory computer readable recording medium storing a computer program product for controlling operation of an access point adapted to communicate with a sensor station (STA) over a communication channel using a contention based channel access, the computer program product comprising software instructions which, when run on processing circuitry of the access point, causes the access point to:

monitor traffic of the communication channel;

estimate a congestion level of the communication channel based on the monitored traffic;

incorporate, into a synchronization frame, information indicative of the estimated congestion level, wherein the synchronization frame is a No Data Packet-Clear To Send (NDP-CTS) short synchronization frame; and transmit the synchronization frame, comprising the information indicative of the estimated congestion level, to the sensor STA.

12. A non-transitory computer readable recording medium storing a computer program product for controlling operation of a sensor station (STA) adapted to communicate with an access point over a communication channel using a contention based channel access, the computer program product comprising software instructions which, when run on processing circuitry of the sensor STA, causes the sensor STA to:

receive a synchronization frame comprising information indicative of an estimated congestion level of the communication channel from the access point, wherein the synchronization frame is a No Data Packet-Clear To Send (NDP-CTS) short synchronization frame;

transmit a data packet using a first modulation and coding scheme;

monitor whether an acknowledgement of the data packet is received from the access point; and if the acknowledgement of the data packet is not received:

select a second modulation and coding scheme based on the information comprised in the synchronization frame and indicative of the estimated congestion level; and retransmit the data packet using the second modulation and coding scheme.

13. An access point adapted to communicate with a sensor station (STA) over a communication channel using a contention based channel access, the access point comprising:

processing circuitry;

memory containing instructions executable by the processing circuitry whereby the access point is operative to:

monitor traffic of the communication channel;

estimate a congestion level of the communication channel based on the monitored traffic;

incorporate, into a synchronization frame, information indicative of the estimated congestion level, wherein the synchronization frame is a No Data Packet-Clear To Send (NDP-CTS) short synchronization frame; and transmit the synchronization frame, comprising the information indicative of the estimated congestion level, to the sensor STA.

14. The access point of claim 13, wherein the instructions are such that the access point is operative to estimate the congestion level based on a slot occupancy of the communication channel.

15. The access point of claim 14, wherein the instructions are such that the access point is operative to estimate the congestion level as a number of occupied slots in a time window divided by a total number of slots in the time window.

16. The access point of claim 13, wherein the synchronization frame comprises at least one bit having a first value if the estimated congestion level is below a threshold and a second value if the estimated congestion level is above the threshold.

17. The access point of claim 13, wherein the instructions are such that the access point is operative to transmit the information indicative of the estimated congestion level in the preamble of the synchronization frame.

18. The access point of claim 13, wherein the instructions are such that the access point is operative to:

use at least one bit of the synchronization frame to transmit either the information indicative of the estimated congestion level or other information; and broadcast information indicative of whether the at least one bit of the synchronization frame provides the information indicative of the estimated congestion level or the other information.

19. A sensor station (STA) adapted to communicate with an access point over a communication channel using a contention based channel access, the sensor STA comprising:

processing circuitry;

memory containing instructions executable by the processing circuitry whereby the sensor STA is operative to:

receive a synchronization frame comprising information indicative of an estimated congestion level of the communication channel from the access point, wherein the synchronization frame is a No Data Packet-Clear To Send (NDP-CTS) short synchronization frame;

transmit a data packet using a first modulation and coding scheme;

monitor whether an acknowledgement of the data packet is received; and if the acknowledgement of the data packet is not received:

select a second modulation and coding scheme based on the information indicative of the estimated congestion level; and retransmit the data packet using the second modulation and coding scheme.

20. The sensor STA of claim 19, wherein the instructions are such that the sensor STA is operative to:

select a default modulation and coding scheme as the second modulation and coding scheme in response to the received information, in the synchronization frame, indicating that the estimated congestion level is below a threshold; and select the first modulation and coding scheme as the second modulation and coding scheme in response to the received information, in the synchronization frame, indicating that the estimated congestion level is above the threshold.

* * * * *